United States Patent
Higashi (10) Patent No.: US 9,695,872 B2
(45) Date of Patent: Jul. 4, 2017

(54) STEERING APPARATUS AND BEARING MEMBER

(71) Applicant: Showa Corporation, Gyoda-shi (JP)

(72) Inventor: Satoru Higashi, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/749,077

(22) Filed: Jun. 24, 2015

(65) Prior Publication Data

US 2016/0207561 A1    Jul. 21, 2016

(30) Foreign Application Priority Data

Jan. 21, 2015    (JP) .................................. 2015-009407

(51) Int. Cl.
| | |
|---|---|
| F16C 33/02 | (2006.01) |
| F16C 29/02 | (2006.01) |
| B62D 3/12 | (2006.01) |
| F16C 33/10 | (2006.01) |
| F16C 33/20 | (2006.01) |

(52) U.S. Cl.
CPC .............. F16C 33/02 (2013.01); B62D 3/12 (2013.01); F16C 29/02 (2013.01); F16C 33/102 (2013.01); F16C 33/20 (2013.01); F16C 2326/24 (2013.01); F16C 2361/61 (2013.01)

(58) Field of Classification Search
CPC ........... B62D 3/126; F16C 29/02; F16C 33/02
See application file for complete search history.

(56) References Cited

U.S. PATENT DOCUMENTS

| | | | | |
|---|---|---|---|---|
| 4,218,933 A | * | 8/1980 | Allen | B62D 3/12 384/291 |
| 5,645,357 A | * | 7/1997 | Alain | F16C 17/10 384/291 |
| 6,485,180 B2 | * | 11/2002 | Mena | B62D 3/12 384/215 |
| 2009/0000853 A1 | * | 1/2009 | Hirose | B62D 3/12 180/400 |
| 2012/0237146 A1 | * | 9/2012 | Tange | F16C 27/063 384/37 |
| 2014/0041466 A1 | * | 2/2014 | Son | F16J 15/324 74/30 |
| 2015/0020618 A1 | * | 1/2015 | Kawakubo | B62D 3/126 74/30 |
| 2015/0251685 A1 | * | 9/2015 | Oda | F16C 27/04 74/422 |

FOREIGN PATENT DOCUMENTS

JP    2002-276654 A    9/2002

* cited by examiner

*Primary Examiner* — Darlene P Condra
(74) *Attorney, Agent, or Firm* — Leason Ellis LLP (57) ABSTRACT

A steering apparatus includes: a rack shaft which moves steered portions based on steering by a steering portion; a cover portion covering the rack shaft; and a bearing member arranged inside the cover portion and supporting the rack shaft so that the rack shaft is movable in an axial direction of the rack shaft, and the bearing member has a reservoir portion reserving a lubricant at a contact spot with respect to the rack shaft.

13 Claims, 5 Drawing Sheets

STEERING APPARATUS AND BEARING MEMBER

CROSS-REFERENCE TO RELATED APPLICATIONS

This application is based on and claims priority under 35 USC 119 from Japanese Patent Application No. 2015-009407 filed on Jan. 21, 2015, the content of which is incorporated herein by reference.

BACKGROUND OF THE INVENTION

1. Field of the Invention

The present invention relates to a steering apparatus for steering and a bearing member.

2. Description of Related Art

A steering apparatus for a vehicle and so on is provided with an input portion receiving a steering force input from a steering portion such as a steering wheel and an output portion transmitting the steering force to steered portions such as wheels by receiving the transmission of the steering force. Then, the steering apparatus applies a rack and pinion mechanism having a pinion shaft and a rack shaft connecting to the pinion shaft for transmitting the force from the input portion to the output portion.

In the rack and pinion mechanism, a bearing member movably supporting the rack shaft is provided. For example, there is disclosed, in JP-A-2002-276654 (Patent Document 1), a bearing including an outer bush made of a synthetic resin having elasticity and an inner bush fixed inside the outer bush. In the bearing disclosed in Patent Document 1, a region abutting on an inner peripheral surface of a gear case and a region adjusting to one end portion of the region in an axial direction and partially not abutting on the inner peripheral surface of the gear case are formed on an outer peripheral surface of the outer bush.

Incidentally, there is a case where a lubricant for smoothing the movement of a rack shaft is provided in the bearing member at a contact spot with respect to the rack shaft. However, there is a danger that the lubricant between the bearing member and the rack shaft is reduced with the movement of the rack shaft. As a result, a large rubbing noise may be generated when the rack shaft moves.

SUMMARY OF THE INVENTION

An object of the present invention is to reduce the rubbing noise generated when the rack shaft moves.

According to an embodiment of the present invention, there is provided a steering apparatus including a rack shaft which moves steered portions based on steering by a steering portion, a cover portion covering the rack shaft, and a bearing member arranged inside the cover portion and supporting the rack shaft so that the rack shaft is movable in an axial direction of the rack shaft, in which the bearing member has a reservoir portion reserving a lubricant at a contact spot with respect to the rack shaft.

Here, the bearing member may include a projecting portion projecting toward the rack shaft to form the contact spot with respect to the rack shaft, and the reservoir portion may be formed at the projecting portion.

The reservoir portion may be at least one concave portion being concave toward a side opposite to a side where the rack shaft is provided.

Also, the reservoir portion may be plural convex portions projecting toward the rack shaft.

Also according to an embodiment of the present invention, there is provided a bearing member for supporting a rack shaft which moves steered portions based on steering by a steering portion so that the rack shaft is movable in an axial direction of the rack shaft, which includes a contact portion projecting toward an inner side of the bearing member in which the rack shaft is to be provided and forming a contact spot with respect to the rack shaft and plural convex portions projecting toward the inner side or at least one concave portion being concave toward an outer side being opposite to the inner side which are provided at the contact portion.

Here, the at least one concave portion may have a hemispherical shape.

The convex portions may have a hemispherical shape.

According to the embodiments of the present invention, the rubbing noise generated when the rack shaft moves can be reduced.

DETAILED DESCRIPTION OF THE INVENTION

Hereinafter, embodiments of the present invention will be explained in detail with reference to the attached drawings.

Embodiment 1

(Entire Structure of Motor-Driven Power Steering Apparatus 1)

Figure 1:
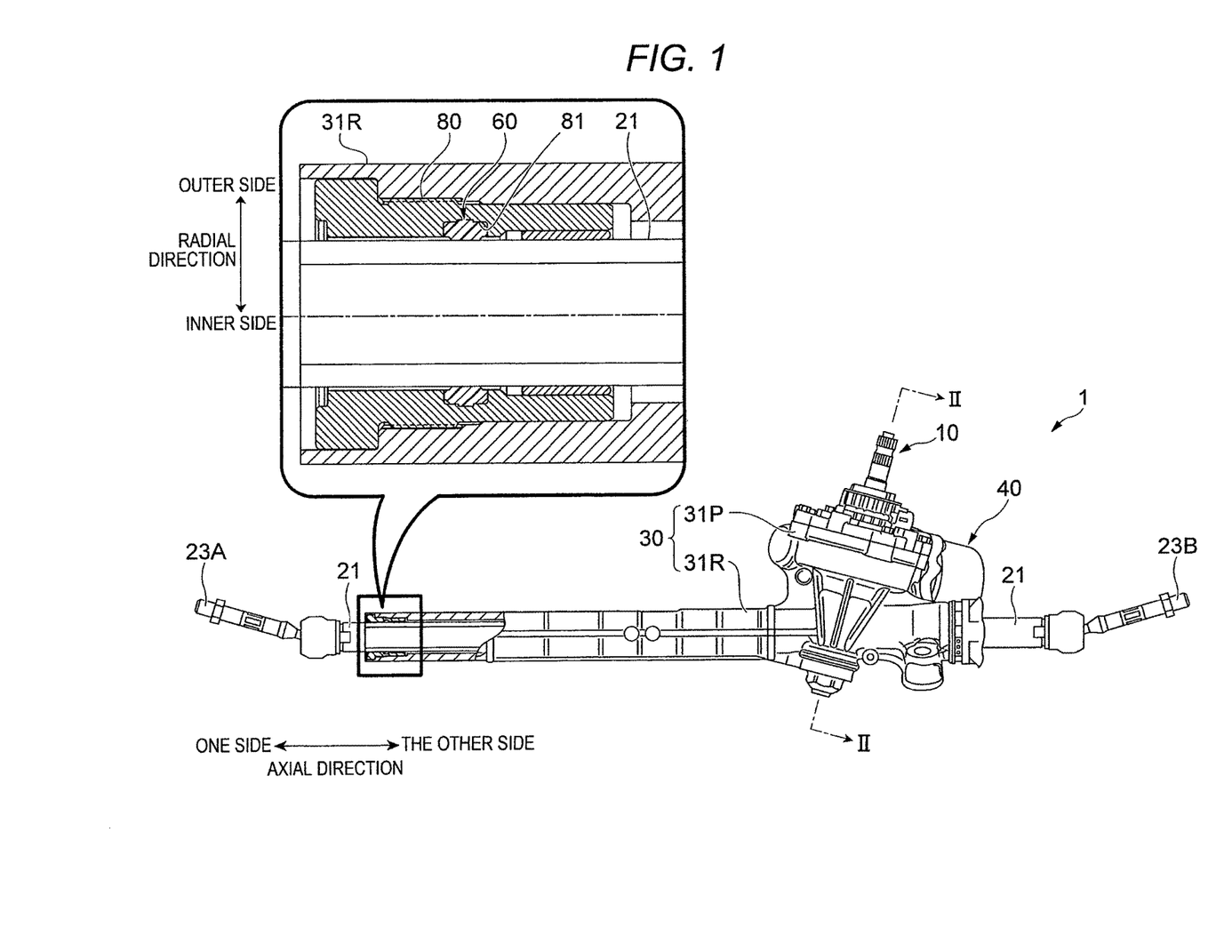
FIG. 1 is a schematic front view of a motor-driven power steering apparatus.

FIG. 1 is a schematic front view of a motor-driven power steering apparatus 1.

Figure 2:
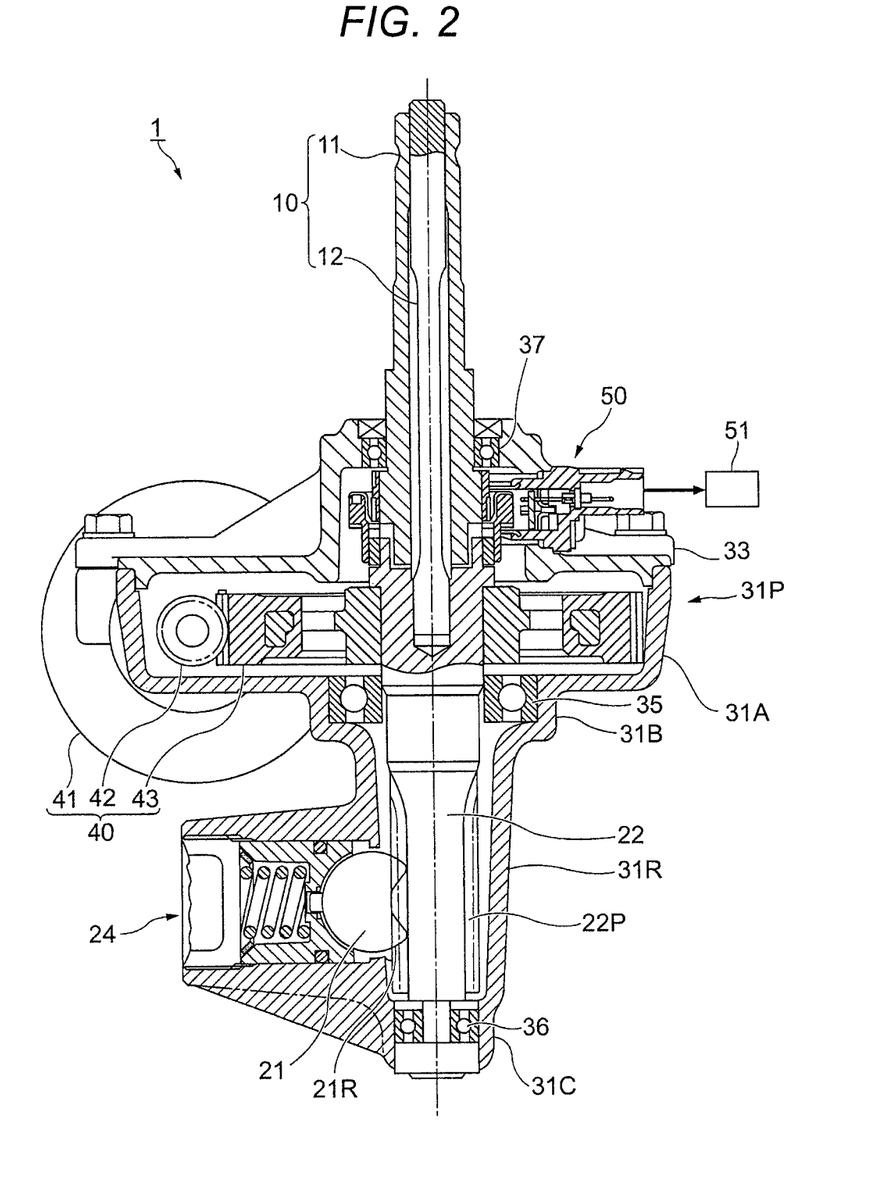
FIG. 2 is a is a cross-sectional view of the motor-driven power steering apparatus shown in FIG. 1 taken along II-II line.

FIG. 2 is a cross-sectional view of the motor-driven power steering apparatus 1 shown in FIG. 1 taken along II-II line.

The motor-driven power steering apparatus 1 according to the embodiment is a steering apparatus for arbitrarily changing a traveling direction of vehicles, and a structure in which the steering apparatus is applied to a vehicle, particularly, a motorcar is cited as an example in the embodiment. The motor-driven power steering apparatus 1 according to the embodiment is a so-called pinion assist type apparatus.

As shown in FIG. 1, motor-driven power steering apparatus 1 includes an input portion 10 to which a steering force from a steering wheel (not shown, an example of a steering portion) operated by a driver, a rack shaft 21 connected to, for example, wheels (not shown, an example of steered portions) to change a direction of the wheels and a pinion shaft 22 (see FIG. 2) receiving a torque from the input portion 10 to move the rack shaft 21 in the axial direction.

The motor-driven power steering apparatus 1 also includes tie rods 23A and 23B provided at end portions of the rack shaft 21 and connected to, for example, the wheels through knuckle arms (not shown), a housing 30 housing various members and an assist portion 40 giving a steering assist force to the pinion shaft 22.

In the following explanation, an axial direction (right and left direction in FIG. 1) of the rack shaft 21 is referred to as an "axial direction", one side (left side in FIG. 1) along the axial direction of the rack shaft 21 is referred to as "one side" and the other side (right side in FIG. 1) along the axial direction of the rack shaft 21 is referred to as "the other side". Also, a circumferential direction with respect to the central axis of the rack shaft 21 is referred to as a "circumferential direction", a radial direction with respect to the central axis of the rack shaft 21 is referred to as a "radial direction", a central axis side in the radial direction is referred to as an "inner side" and a side separated from the central axis in the radial direction is referred to as an "outer side".

Moreover, as shown in FIG. 2, the motor-driven power steering apparatus 1 includes a rack guide 24 pressing the rack shaft 21 toward the pinion shaft 22, a torque detecting apparatus 50 detecting a steering torque of the steering wheel and an electronic control unit (ECU) 51 controlling drive of an electric motor 41 (described later) of the assist portion 40.

The input portion 10 includes an input shaft 11 to which the steering force from the steering wheel operated by a driver is transmitted and a torsion bar 12 attached to the inside of the input shaft 11.

The rack shaft 21 is a hollow bar-shaped member made of, for example, iron. The rack shaft 21 includes a rack 21R formed by plural teeth arranged in the axial direction. The rack shaft is attached so that the rack 21R is engaged with a later-described pinion 22P of the pinion shaft 22. Then, the rack shaft 21 moves in the axial direction by receiving the rotation of the pinion shaft 22. The rack shaft 21 may be a solid bar-shaped member.

The pinion shaft 22 is a member in which the pinion 22P is formed. Then, as described above, the pinion 22P of the pinion shaft 22 is connected to the rack 21R of the rack shaft 21. A rotational force of the pinion shaft 22 is converted into the movement of the rack shaft 21 in the axial direction by the pinion shaft 22 and the rack shaft 21.

The pinion shaft 22 is connected to the torsion bar 12. Therefore, the pinion shaft 22 is rotated by receiving the steering force from the input shaft 11 through the torsion bar 12. In the embodiment, a later-described worm wheel 43 of the assist portion 40 is connected to the pinion shaft 22. Therefore, the pinion shaft 22 is rotated by receiving an assist steering force from the assist portion 40 in addition to the steering force from the input shaft 11.

As shown in FIG. 1, the housing 30 is made of, for example, aluminum or iron, including a rack housing 31R (an example of a cover member) which mainly houses the rack shaft 21 and a pinion housing 31P which mainly houses the pinion shaft 22 (see FIG. 2).

The rack housing 31R is an approximately cylindrical member, which is formed along the axial direction of the rack shaft 21. The rack housing 31R has a bush 60 and an end case 80 inside the approximately cylindrical shape.

The bush 60 is provided coaxially with the rack shaft 21 inside the rack housing 31R. In particular, the bush 60 is attached to a circumferential holding groove 81 formed in the end case 80 in the embodiment. Then, the bush 60 supports the rack shaft 21 inserted into the inside so as to be slidable in the axial direction. The bush 60 will be explained in detail later.

Then, in a motor-driven power steering apparatus 1 according to the embodiment, a lubricant (grease) is applied between the bush 60 and the rack shaft 21. As the lubricant, a semisolid material or a solid material obtained by dispersing a thickener in a lubricating oil can be used. Additionally, an additive can be suitably blended with the lubricant.

The end case 80 has an approximately cylindrical outline. The end case 80 is provided so as to be inserted into the rack housing 31R at an end portion in the axial direction of the rack housing 31R. The end case 80 is provided coaxially with the rack shaft 21 and holds the bush 60 in an inner peripheral surface (holding groove 81). As materials for the end case 80, for example, metals such as aluminum can be used.

The rack housing 31R thus formed covers the rack shaft 21, the bush 60 and the end case 80 and houses these members.

The pinion housing 31P has an approximately cylindrical outline. The pinion housing 31P is provided in a direction where a cylindrical shaft direction crosses the axial direction of the rack housing 31R. The pinion housing 31P rotatably holds the pinion shaft 22 through a first bearing 35 and a second bearing 36 as shown in FIG. 2. A cover 33 is attached to an opening of the pinion housing 31P. The cover 33 rotatably holds the input shaft 11 through a third bearing 37.

In the shown example, a worm wheel 43, the first bearing 35 and the second bearing 36 are arranged in this order from the central part side toward the end portion side in the axial direction of the pinion shaft 22. In the pinion housing 31P, a portion housing the worm wheel 43 inside is referred to as a first outer peripheral portion 31A, a portion housing the first bearing 35 inside is referred to as a second outer peripheral portion 31B and a portion housing the second bearing 36 inside is referred to as a third outer peripheral portion 31C.

As shown in FIG. 2, the assist portion 40 includes the electric motor 41, a worm gear 42 and the worm wheel 43.

The electric motor 41 is controlled by the electronic control unit 51 to rotatably drive the worm gear 42. The worm gear 42 is connected to an output shaft of the electric motor 41, rotating by receiving the drive force from the electric motor 41. The worm wheel 43 is connected to the worm gear 42, to which the drive force from the electric motor 41 is transmitted. Therefore, a rotational force of the electric motor 41 is transmitted to the pinion shaft 22 after decelerated by the worm wheel 43.

[Function/Structure of Bush 60]

Figures 3A, 3C:
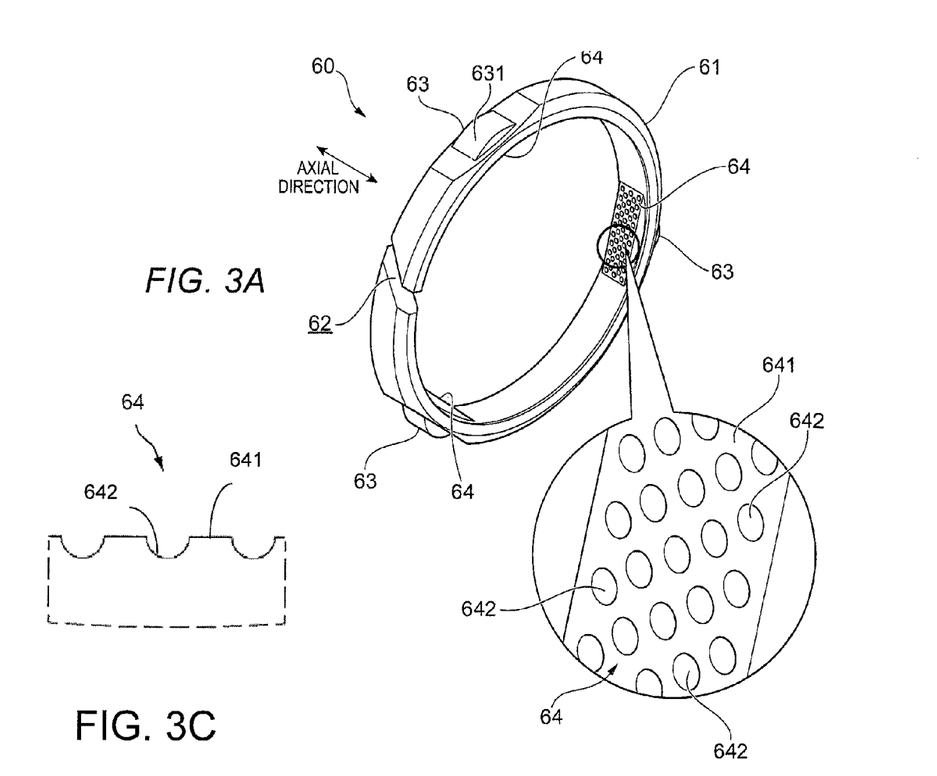
FIGS. 3A and 3B are explanatory views of a bush according to Embodiment 1.
FIG. 3C is a cross-section view of the inward projection portion according to Embodiment 1.
Figure 3B:
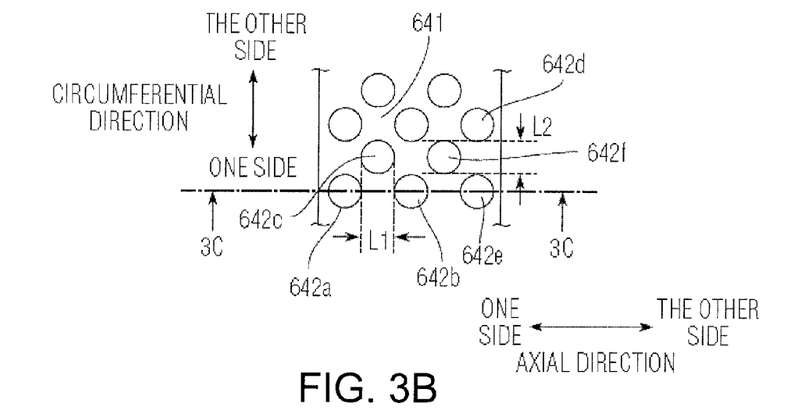

FIGS. 3A and 3B are explanatory views of the bush 60 according to Embodiment 1. FIG. 3A is an entire perspective view of the bush 60 according to Embodiment 1 and FIG. 3B is a schematic view for explaining the arrangement of later-described spherical concave portions 642.

As shown in FIG. 3A, the bush 60 (an example of the bearing member) includes an approximately annular-shaped bush body 61, a separated portion 62 forming a cut-off portion in a part of the bush body 61 in the circumferential direction, outward projecting portions 63 provided on the outer side of the bush body 61 in the radial direction, and inward projecting portions 64 (an example of a projecting portion and a contact portion) provided on the inner side of the bush body 61 in the radial direction.

As materials for the bush 60 in the embodiment, synthetic resins such as polyurethane, polyacetal, polypropylene and polytetrafluoroethylene can be used. The bush 60 can be also formed by integral molding such as injection molding.

(Bush Body 61, Separated Portion 62)

The bush body 61 is fitted to the holding groove 81 (see FIG. 1) of the end case 80.

The separated portion 62 is formed in a part in the circumferential direction. In the embodiment, deformation to narrow an interval of a gap in the separated portion 62 is possible at the time of attaching the bush 60 to the end case 80.

(Outward Projecting Portions 63)

Plural (three) outward projecting portions 63 are provided in the embodiment. The plural outward projecting portions 63 are arranged at equal intervals in the circumferential direction of the bush body 61 in the embodiment.

Then, the outward projecting portions 63 are formed at positions facing the inward projecting portions 64 in the circumferential direction of the bush body 61. That is, the outward projecting portions 63 and the inward projecting portions 64 are arranged side by side along the radial direction of the bush body 61.

Each outer projecting portion 63 has a curved surface 631. The curved surface 631 is formed to be an arc shape along the circumferential direction. In the embodiment, the curved surface 631 of the outer projecting portion 63 contacts the holding groove 81 (see FIG. 1) of the end case 80.

(Inward Projecting Portion 64)

Plural (three) inward projecting portions 64 are provided in the embodiment. The plural inward projecting portions 64 are arranged at equal intervals in the circumferential direction of the bush body 61 in the embodiment. Then, the inward projecting portions 64 form contact portions with respect to the rack shaft 21.

Also in the embodiment, an inner diameter of a virtual circle passing a portion contacting the rack shaft 21 in the inner projecting portion 64 is formed to be smaller than an outer diameter of the rack shaft 21. That is, the bush 60 supports the rack shaft 21 with a predetermined interference.

Each inward projecting portion 64 has a flat surface portion 641 and the spherical concave portions 642 (an example of the reservoir portion and the at least one concave portion).

The flat surface portion 641 is formed on an approximately flat surface, forming a surface directed to the rack shaft 21 side. The flat surface portion 641 also projects toward the rack shaft 21 side as compared with other portions inside the bush body 61. That is, the flat surface portion 641 has a shorter distance from the shaft center of the bush body 61 as compared with other portions. Then, the flat surface portion 641, which does not include the spherical concave portions 642, linearly contacts (axial direction) the rack shaft 21 having a circular outer shape.

Plural spherical concave portions 642 are provided in the embodiment, which are arranged in a predetermined pattern. The spherical concave portions 642 are formed to have a hemispherical shape. The hemispherical shape does not mean a complete hemisphere but includes a shape shallower than the complete hemisphere or a shape of an approximately half of an ellipsoid. See FIG. 3C.

The arrangement of plural spherical concave portions 642 will be further explained specifically. Hereinafter, explanation will be made by adding alphabetic characters to numerals "642" for convenience to distinguish plural spherical concave portions 642.

As shown in FIG. 3B, the plural spherical concave portions 642 are arranged so that the plural spherical concave portions 642 continue without a break in the axial direction when seeing the plural spherical concave portions 642 from the circumferential direction. For example, concerning the circumferential direction, between a spherical concave portion 642a and a spherical concave portion 642b which are adjacent on one side in the circumferential direction, a spherical concave portion 642c is arranged on the other side in the circumferential direction. A length L1 between the spherical concave portion 642a and the spherical concave portion 642b is set to be the same as a diameter of the spherical concave portion 642c or smaller than the diameter of the spherical concave portion 642c.

Similarly, when seeing the plural spherical concave portions 642 from the axial direction, the plural spherical concave portions 642 are arranged so as to continue without a break in the circumferential direction. For example, concerning the axial direction, a spherical concave portion 642f is arranged on one side in the axial direction between a spherical concave portion 642d and a spherical concave portion 642e which are adjacent on the other side in the axial direction. A length L2 between the spherical concave portion 642d and the spherical concave portion 642e is set to be the same as a diameter of the spherical concave portion 642f or smaller than the diameter of the spherical concave portion 642f.

The inward projecting portions 64 of the bush 60 having the above structure support the rack shaft 21 when the rack shaft 21 moves in the axial direction. Especially in the embodiment, the inward projecting portions 64 of the bush 60 form the interference and contact the rack shaft 21 with a smaller area as compared with, for example, a case where the bush 60 contacts the rack shaft 21 over the entire circumference in the circumferential direction. Accordingly, the motor-drive power steering apparatus 1 according to the embodiment can reduce the friction resistance between the bush 60 and the rack shaft 21 while positively supporting the rack shaft 21 by the bush 60.

Also in the embodiment, the inward projecting portions 64 of the bush 60 have the spherical concave portions 642. The spherical concave portions 642 function so as to reserve the lubricant respectively, operating so as to hold the lubricant, from leaving from the bush 60 with the movement of the rack shaft 21 in the axial direction. As a result, in the motor-drive power steering apparatus 1 according to the embodiment, the lubricant is easily reserved in the bush 60 and generation of rubbing noise due to the movement of the rack shaft 21 can be reduced.

Additionally, as described above, the bush 60 can support the rack shaft 21 with a relatively large interference as the bush 60 can reduce the sliding resistance with respect to the rack shaft 21. As a result, generation of a hammering sound between the pinion shaft 22 and the rack shaft 21 (so called rattle sound) which can be generated due to insufficient support of the rack shaft 21 is suppressed. In particular, when the bush 60 made of a synthetic resin is used, the bush 60 may be expanded or contracted due to creep deformation or thermal history, however, good support of the rack shaft 21 can be realized in such cases.

Embodiment 2

Next, a bush 260 according to Embodiment 2 will be explained. In Embodiment 2, the same symbols are given to the same components as other embodiments, and the detailed explanation thereof is omitted.

Figure 4:
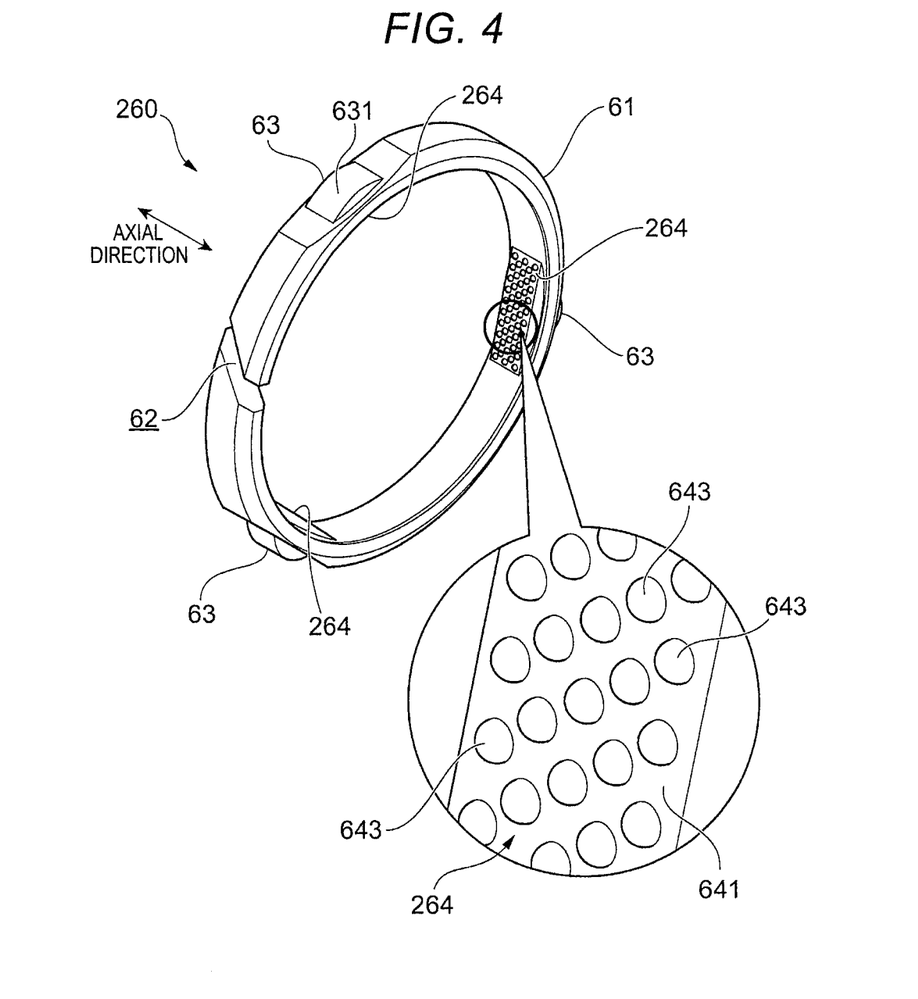
FIG. 4 is an entire perspective view of a bush according to Embodiment 2.

FIG. 4 is an entire perspective view of the bush 260 according to the Embodiment 2.

[Function/Structure of Bush 260]

The bush 260 (an example of the bearing member) according to Embodiment 2 includes the bush body 61, the separated portion 62, the outward projecting portions 63 and inward projecting portions 264 (an example of a projecting portion and a contact portion) provided in the inner side of the bush body 61 in the radial direction. That is, the bush 260 according to Embodiment 2 differs from the bush 60 according to Embodiment 1 in a structure of the inward projecting portions 264. Hereinafter, the inward projecting portions 264 will be explained in detail.

(Inward Projecting Portions 264)

Plural (three) inward projecting portions 264 are provided in the embodiment. The plural inward projecting portions 264 are arranged at equal intervals in the circumferential direction of the bush body 61 in the embodiment. Also in the embodiment 2, an inner diameter of a virtual circle passing a portion contacting the rack shaft 21 in the inner projecting portion 264 is formed to be smaller than an outer diameter of the rack shaft 21. That is, the bush 260 supports the rack shaft 21 with a predetermined interference.

Each inward projecting portion 264 has the flat surface portion 641 and spherical convex portions 643 (examples of the reservoir portion and convex portions).

Plural spherical convex portions 643 are provided in Embodiment 2, which are arranged in a predetermined pattern. The spherical convex portions 643 according to Embodiment 2 are formed to have a hemispherical shape.

The hemispherical shape does not mean a complete hemisphere but includes a shape shallower than the complete hemisphere or a shape of an approximately half of an ellipsoid.

The arrangement of plural spherical convex portions 643 will be further explained specifically. The arrangement of the plural spherical convex portions 643 are the same as the arrangement of the plural spherical concave portions 642 explained with reference to FIG. 3B.

The plural spherical convex portions 643 are arranged so that the plural spherical concave portions 643 continue without a break in the axial direction when seeing the plural spherical convex portions 643 from the circumferential direction. For example, concerning the circumferential direction, between two spherical convex portions 643 which are adjacent on one side in the circumferential direction, a spherical convex portion 643 is arranged on the other side in the circumferential direction. A length between the two spherical convex portions 643 is set to be the same as a diameter of the other spherical convex portion 643 or set to be smaller than the diameter of the other spherical convex portion 643.

Similarly, when seeing the plural spherical convex portions 643 from the axial direction, the plural spherical convex portions 643 are arranged so as to continue without a break in the circumferential direction. For example, concerning the axial direction, a spherical convex portion 643 is arranged on one side in the axial direction between two spherical convex portions 643 which are adjacent on the other side in the axial direction. A length between the two spherical convex portions 643 is set to be the same as a diameter of the spherical convex portion 643 on one side or smaller than the diameter of the spherical convex portion 643 on one side.

Also in the bush 260 according to Embodiment 2 having the above structure, plural spherical convex portions 643 function so as to reserve the lubricant between one spherical convex portion 643 and the other spherical convex portion 643. Namely, the plural spherical convex portions 643 operate so as to hold the lubricant from leaving from the bush 260 with the movement of the rack shaft 21 in the axial direction. As a result, in the motor-drive power steering apparatus 1 according to Embodiment 2, the lubricant is easily reserved in the bush 260 and generation of rubbing noise due to the movement of the rack shaft 21 can be reduced.

Embodiment 3 and Embodiment 4

Next, a bush 360 according to Embodiment 3 and a bush 460 according to Embodiment 4 will be explained. In the following explanation, the same symbols are given to the same components as other embodiments, and the detailed explanation thereof is omitted.

Figure 5A:
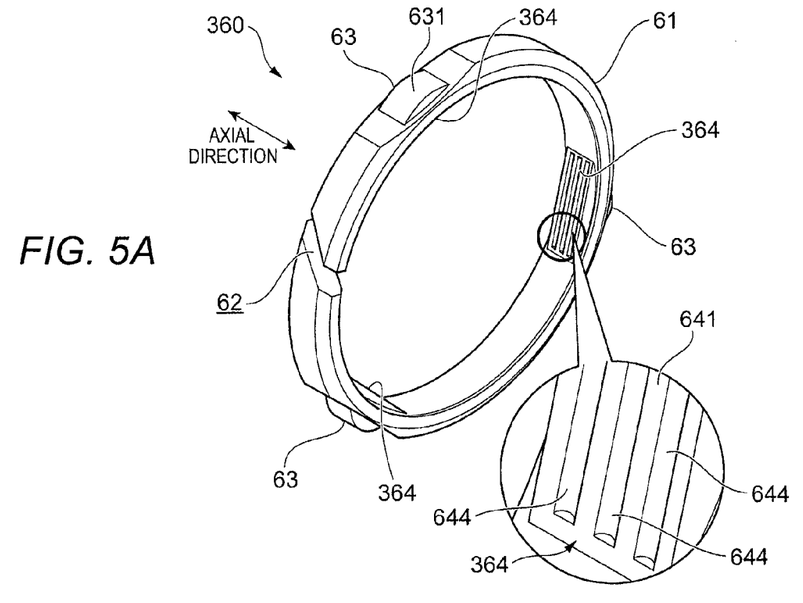
FIGS. 5A and 5B are entire perspective views of bushes according to Embodiment 3 and Embodiment 4.
Figure 5B:
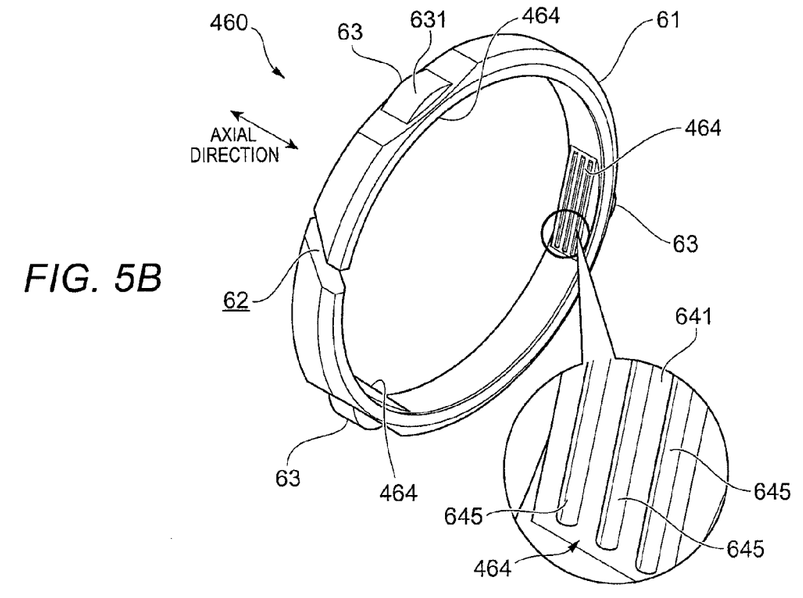

FIG. 5A is an entire perspective view of the bush 360 according to Embodiment 3 and FIG. 5B is an entire perspective view of the bush 460 according to Embodiment 4.

[Function/Structure of Bush 360]

The bush 360 (an example of the bearing member) according to Embodiment 3 includes inward projecting portions 364 (an example of a projecting portion and a contact portion) as shown in FIG. 5A instead of the inward projecting portions 64 of Embodiment 1. Then, each inward projecting portion 364 includes the flat surface portion 641 and groove portions 644 (an example of the reservoir portion and the at least one concave portion). Hereinafter, the groove portions 644 will be explained in detail.

The plural (three in the embodiment) groove portions 644 are provided. The groove portions 644 are formed in straight lines in the flat surface portion 641. Then, the groove portions 644 are formed so as to extend along a direction (orthogonal direction) crossing the axial direction.

Also in the bush 360 according to Embodiment 3 having the above structure, groove portions 644 function so as to reserve the lubricant respectively. That is, the groove portions 644 operate so as to hold the lubricant to leave from the bush 360 with the movement of the rack shaft 21 in the axial direction. As a result, in the motor-drive power steering apparatus 1 according to the embodiment, the lubricant is easily reversed in the bush 360 and generation of rubbing noise due to the movement of the rack shaft 21 can be reduced.

[Function/Structure of Bush 460]

The bush 460 (an example of the bearing member) according to Embodiment 4 includes inward projecting portions 464 (examples of a projecting portion and a contact portion) as shown in FIG. 5B instead of the inward projecting portions 264 of Embodiment 2. Then, each inward projecting portion 464 includes the flat surface portion 641 and ridge portions 645 (examples of the reservoir portion and convex portions). Hereinafter, the ridge portions 645 will be explained in detail.

The plural (three in the embodiment) ridge portions 645 are provided. Respective ridge portions 645 project toward the inner side in the radial direction where the rack shaft 21 is provided. The ridge portions 645 are formed in straight lines in the flat surface portion 641. The ridge portions 645 are also formed so as to extend along a direction (orthogonal direction) crossing the axial direction.

Also in the bush 460 according to Embodiment 4 having the above structure, plural ridge portions 645 function so as to reserve the lubricant respectively. That is, the plural ridge portions 645 reserve the lubricant between adjacent two ridge portions 645. The plural ridge portions 645 operate so as to hold the lubricant to leave from the bush 460 with the movement of the rack shaft 21 in the axial direction. As a result, in the motor-drive power steering apparatus 1 according to the embodiment, the lubricant is easily reversed in the bush 460 and generation of rubbing noise due to the movement of the rack shaft 21 can be reduced.

Note that the bush 60 (260, 360 and 460) may have other shapes as long as the bush is configured to reserve the lubricant at contact spots with respect to the rack shaft 21, and the present invention is not limited to the structures of the spherical concave portions 642, the spherical convex portions 643, the groove portions 644 and the ridge portions 645 according to Embodiments 1 to 4.

Furthermore, the entire shape of the bush 60 (260, 360 and 460) is not limited to the above-described shapes of Embodiments 1 to 4. The bush 60 is also not limited to the structure of being provided inside the end case 80, and may have other structures as long as the bush can support the rack shaft 21.

The above respective embodiments have been explained by using examples of the motor-drive power steering apparatus, however, the present invention is not limited to this. For example, the structures of the embodiments can be applied to motor-drive power steering apparatuses of other systems such as a rack assist type. Also, the structures of the embodiments can be applied to a power steering apparatus generating an assist force by hydraulic pressure or a manual steering apparatus not generating the power assist force.

What is claimed is:

1. A steering apparatus comprising:
    a rack shaft which moves steered portions based on steering by a steering portion;
    a cover portion covering the rack shaft; and
    a bearing member arranged inside the cover portion and supporting the rack shaft so that the rack shaft is movable in an axial direction of the rack shaft,
    wherein the bearing member has a reservoir portion holding a lubricant at a contact spot with respect to the rack shaft, and a projecting portion projecting toward the rack shaft to form the contact spot.

2. The steering apparatus according to claim 1, wherein the reservoir portion is formed at the projecting portion.

3. The steering apparatus according to claim 2, wherein the reservoir portion is at least one concave portion that is concaved toward an outer surface of the bearing member in a radial direction of the rack shaft.

4. The steering apparatus according to claim 2, wherein the reservoir portion is formed at plural convex portions projecting toward the rack shaft, and the lubricant is held between two of the plural convex portions.

5. The steering apparatus according to claim 1, wherein the reservoir portion is at least one concave portion that is concaved toward an outer surface of the bearing member in a radial direction of the rack shaft.

6. The steering apparatus according to claim 5, wherein the reservoir portion is plural concave portions, and the plural concave portions are arranged in such a manner that the plural concave portions are placed without a break in the axial direction when viewed from a circumferential direction of the rack shaft.

7. The steering apparatus according to claim 5, wherein the at least one concave portion has a spherical shape when viewed in the axial direction of the rack shaft.

8. The steering apparatus according to claim 1, wherein the reservoir portion is formed at plural convex portions projecting toward the rack shaft, and the lubricant is held between two of the plural convex portions.

9. The steering apparatus according to claim 8, wherein the plural convex portions are arranged in such a manner that the plural concave portions are placed without a break in the axial direction when viewed from a circumferential direction of the rack shaft.

10. The steering apparatus according to claim 8, wherein each of the plural convex portions has a spherical shape when viewed in the axial direction of the rack shaft.

11. A bearing member for supporting a rack shaft which moves steered portions based on steering by a steering portion so that the rack shaft is movable in an axial direction of the rack shaft, comprising:
    a contact portion projecting toward an inner side of the bearing member in a radial direction of the rack shaft against which the rack shaft abuts and forming a contact spot with respect to the rack shaft; and
    plural convex portions projecting toward the inner side of the bearing member in the radial direction, or at least one concave portion that is concaved toward an outer surface of the bearing member in the radial direction, wherein
    the plural convex portions or the at least one concave portion are provided at the contact portion so that a lubricant is held at the contact spot, and
    when the plural convex portions are provided, the lubricant is held between two of the plural convex portions.

12. The bearing member according to claim 11, wherein each of the at least one concave portion has a hemispherical shape when viewed in a radial direction of the rack shaft.

13. The bearing member according to claim 11, wherein each of the convex portions has a hemispherical shape when viewed in a radial direction of the rack shaft.

* * * * *